(12) United States Patent
Iguchi et al.

(10) Patent No.: US 8,837,007 B2
(45) Date of Patent: Sep. 16, 2014

(54) IMAGE PROCESSING METHOD FOR EXTRACTING AN AREA OF A DOCUMENT FROM A READ IMAGE

(75) Inventors: Ryosuke Iguchi, Kawasaki (JP); Nobutaka Miyake, Yokohama (JP); Hiromitsu Akiba, Yokohama (JP); Yusuke Hashii, Chofu (JP); Tetsuya Suwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 13/182,836

(22) Filed: Jul. 14, 2011

(65) Prior Publication Data
US 2012/0013954 A1    Jan. 19, 2012

(30) Foreign Application Priority Data
Jul. 16, 2010    (JP) .................................. 2010-162096

(51) Int. Cl.
*H04N 1/40* (2006.01)
*H04N 1/00* (2006.01)
*H04N 1/38* (2006.01)
*H04N 1/10* (2006.01)

(52) U.S. Cl.
CPC ............ *H04N 1/38* (2013.01); *H04N 1/00795* (2013.01); *H04N 1/00708* (2013.01); *H04N 1/1013* (2013.01); *H04N 1/00718* (2013.01); *H04N 1/00779* (2013.01); *H04N 1/00737* (2013.01); *H04N 1/00753* (2013.01); *H04N 1/00681* (2013.01); *H04N 1/00816* (2013.01); *H04N 1/00748* (2013.01)
USPC .......................................................... 358/449

(58) Field of Classification Search
USPC ................. 358/449, 3.26–3.27; 382/254–269
See application file for complete search history.

(56) References Cited

U.S. PATENT DOCUMENTS 7,420,717 B2 *   9/2008   Park .............................. 358/474

FOREIGN PATENT DOCUMENTS

| JP | 2008-124604 | * | 5/2008 | ............... H04N 1/40 |
| JP | 2008-141440 A | | 6/2008 | |

* cited by examiner

*Primary Examiner* — Barbara Reinier
(74) *Attorney, Agent, or Firm* — Canon USA, Inc. IP Division

(57) ABSTRACT

An image processing method in which the image of a document is extracted from an image including the image of the document on a document positioning table, acquired by a line sensor scanning the document placed on the document positioning table while illuminating the document from the upstream side or the downstream side of the scanning includes extracting the edge of the image on the document positioning table to set a provisional document area based on the edge, detecting a bright area where light incident on the line sensor is excessive, at the illuminated edge on the upstream side or the downstream side in the scanning direction from the image of the provisional area, and determining the area of the document by removing the area where light is excessive from the provisional area.

19 Claims, 10 Drawing Sheets

FIG.3A WHOLE SURFACE IMAGE ON DOCUMENT POSITIONING PLATE
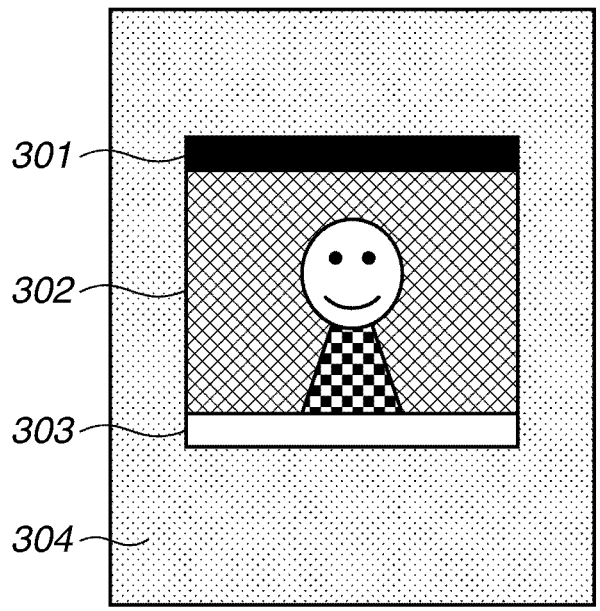
301
302
303
304
EDGE EXTRACTION
FIG.3B EDGE EXTRACTION IMAGE
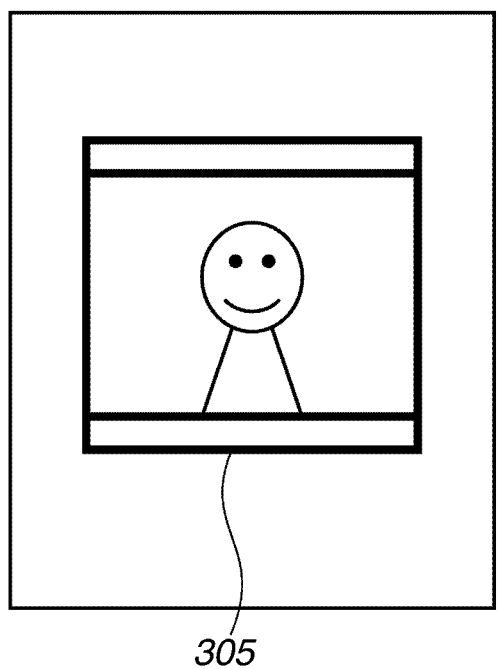
305

UNIT POSITION A      UNIT POSITION B

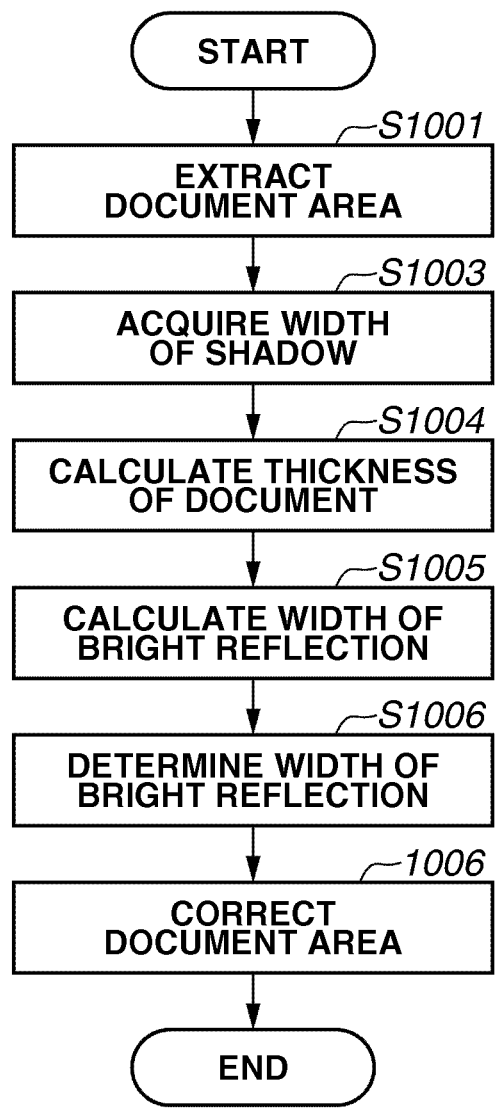

IMAGE PROCESSING METHOD FOR EXTRACTING AN AREA OF A DOCUMENT FROM A READ IMAGE

BACKGROUND OF THE INVENTION

1. Field of the Invention

The present invention relates to a technique for extracting an area of a document from an image read by an image reading apparatus such as a scanner.

2. Description of the Related Art

Heretofore, in document scanning, a user places a document such as a photograph on a document positioning plate and subjects an image read by a scanner on the whole surface of the document positioning plate to an edge extraction processing and a luminance and saturation determination processing to extract the edge of the document, creating the image data only of the area of the document. The position where the document is positioned and the tilt thereof are detected to extract the image of the document.

When the document is read by a scanner, however, an area around the edge of the document can be darkened by a shadow or brightened due to excessive reflected light. Normally, the document is obliquely irradiated with the light of the scanner, so that such shadow and excessive reflected light are generated. A method for removing the shadow has been discussed, but a method for correcting the excessive reflected light has not been proposed.

SUMMARY OF THE INVENTION

According to an aspect of the present invention, an image processing method in which the image of a document is extracted from an image including the image of the document on a document positioning table, acquired by a line sensor scanning the document placed on the document positioning table while illuminating the document from the upstream side or the downstream side of the scanning, includes extracting the edge of the image on the document positioning table to set a document provisional area based on the edge, detecting a bright area where light incident on the line sensor is excessive at the illuminated edge on the upstream side or the downstream side in the scanning direction, from the image of the provisional area, and determining the area of the document by removing the area where light is excessive from the provisional area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B are schematic diagrams in which an image on the whole surface of a document positioning plate is subjected to an edge extraction processing.

FIG. 10 illustrates a flow chart of the processing according to the present invention.

DESCRIPTION OF THE EMBODIMENTS

Various exemplary embodiments, features, and aspects of the invention will be described in detail below with reference to the drawings.

Figure 1:
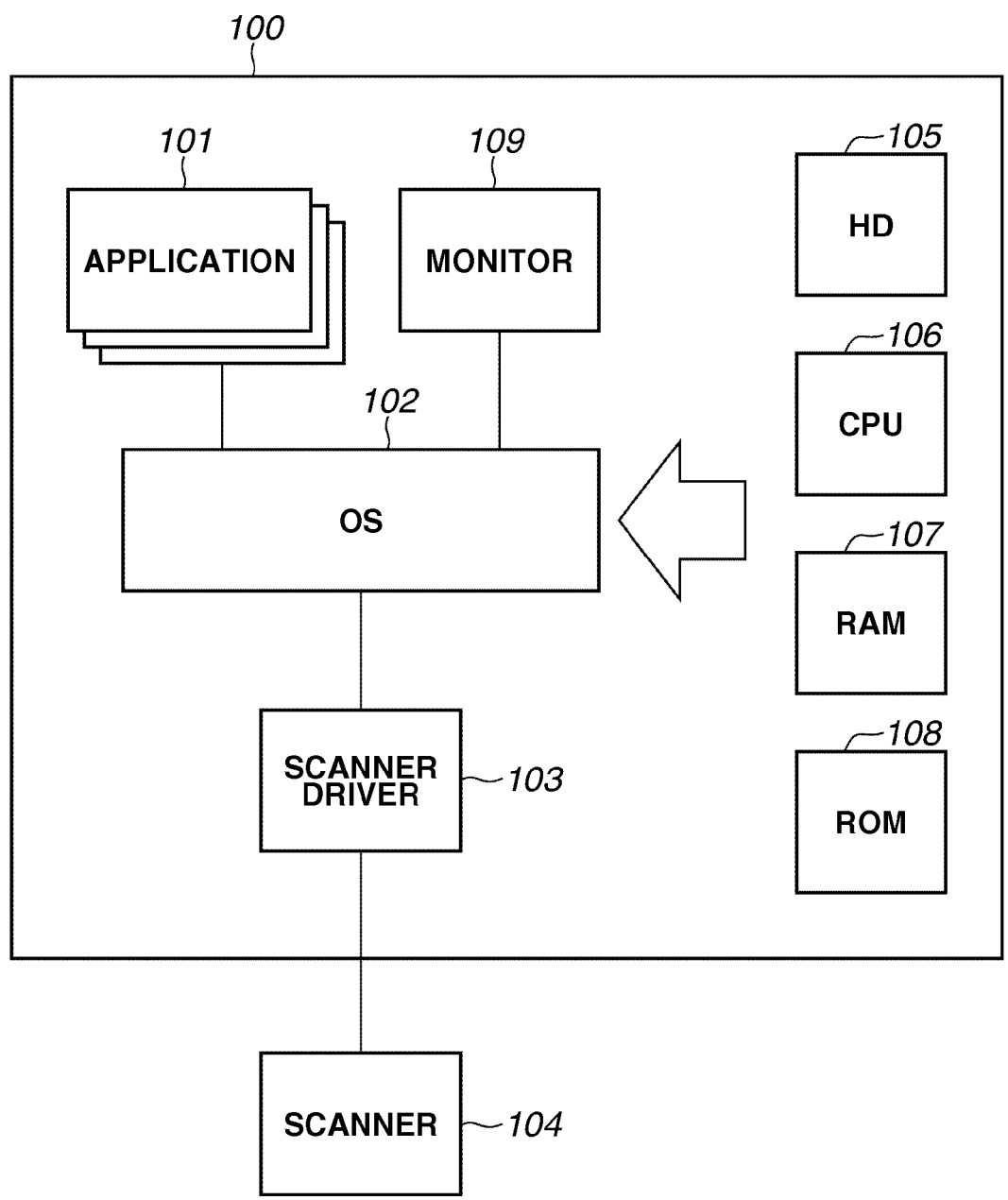
FIG. 1 is a block diagram illustrating a configuration of an image processing system to which the present invention is applied.

FIG. 1 is an example of a schematic diagram of a system in the present exemplary embodiment. A computer 100 is connected to a scanner 104. The computer 100 includes application software 101 such as image processing software, an operating system (OS) 102, and a monitor 109. The computer 100 includes a scanner driver 103 as software for transferring the scanned image data to the OS 102. The scanned image data input to the OS 102 are subjected to image processing by the application 101. The computer 100 also includes various types of hardware on which the application is operable such as a hard disk drive (HD) 105, a central processing unit (CPU) 106, a random access memory (RAM) 107, and a read only memory (ROM) 108.

In the computer 100, the application 101 instructs the scanner 104 to pick up an image based on the image displayed on the monitor 109 and causes the scanner 104 to optically read the document placed on the document positioning plate of the scanner 104 via the scanner driver 103. The scanned input image data are transferred again to the application 101 via the scanner driver 103.

Figure 2:
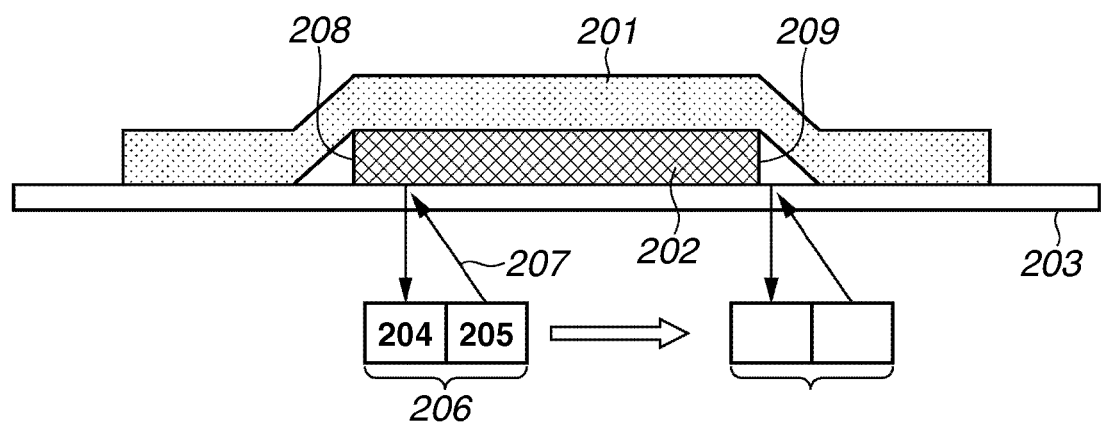
FIG. 2 is a schematic diagram illustrating how a scanner reads a document.

A mechanism in which the scanner 104 reads a document is described below with reference to FIG. 2. In FIG. 2, a document 202 is placed downward on a glass plate 203 which is a document positioning plate. The document 202 is covered with a pressing plate 201 to press the document 202. A sensor unit 206 in which a line sensor 204 inside the scanner 104 is integrated with a light guide 205 which guides light in a line form from a light source to the document is moved from the left direction (the upstream side) to the right direction (the downstream side). In FIG. 2, the document is illuminated from the downstream side. The moving direction of the sensor unit is a sub-scanning direction for reading. The direction perpendicular to the sub-scanning direction toward the rear of the figure is the main scanning direction. The sensor unit 206 is long toward the rear of the figure and arranged parallel to the main scanning direction.

The light guide 205 irradiates the document with light at an angle of about 45 degrees (irradiation light 207). The irradiation light 207 passes through the glass plate 203 and is reflected by the document 202. The line sensor 204 receives a perpendicular component among lights reflected from the document 202 and converts the intensity thereof into an electrical signal. In this state, the sensor unit 206 moves in the sub-scanning direction at a constant speed to read the document and sequentially form pixels. The range which the sensor unit 206 reads in the main or sub-scanning directions can be specified by the user.

An area of the document is extracted from thus scanned image on the document positioning plate. More specifically, the edge of the document is extracted by a generally known edge extraction filter such as a Laplacian filter or a Sobel filter. At this time, a shadow appears on the upper edge 208 of the document in FIG. 2 and bright reflection is caused on the lower edge 209 thereof. The shadow exists blackly along the upper edge 208 of the document. The bright reflection exists whitely along the lower edge 209 thereof. If the edges are extracted, a document larger than usual is extracted as illustrated in FIGS. 3A and 3B. FIG. 3A illustrates an image acquired in scanning the whole surface of the document positioning plate, namely, a shadow 301, a document area 302, a bright reflection area 303. A portion 304 represents the pressing plate 201. FIG. 3B illustrates an image in which the edges of the image are extracted. In FIG. 3B, a black portion 305 indicates an edge area and a white portion indicates a non-edge area. When the document placed on the document positioning plate is extracted, an outermost edge is normally extracted and a provisional document area (a provisional area) is set. This allows an edge to be accurately extracted even if the document is a photograph with an edge.

Figure 4:
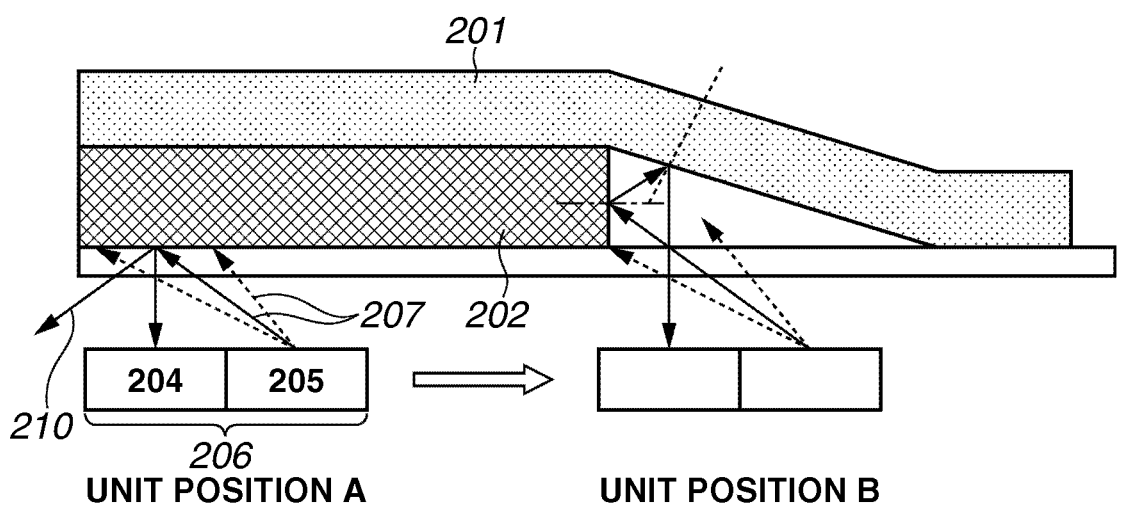
FIG. 4 illustrates a mechanism that causes bright reflection on a document.

Next, FIG. 4 shows that more light reflected from the document or the document positioning plate is incident on the line sensor than from the actual document, which causes bright reflection. The irradiation light 207 is reflected by the document 202. A major part 210 of the reflection light follows an optical path illustrated in FIG. 4. The perpendicularly reflected light among the reflection light reaches the line sensor 204. Thus, the sensor unit 206 moves in the sub-scanning direction while the line sensor 204 is receiving the reflection light. When the sensor unit 206 reaches a position (a unit position B) outside the document 202, the irradiation light 207 is incident on the side of the document 202. The light reflected by the side is reflected by the pressing plate 201 and the perpendicularly reflected light among them reaches the line sensor 204. In this case, a major part of the irradiation light 207 is received by the line sensor 204, so that an amount of reception light is greater in the unit position B than in the unit position A. As a result, an image is read brighter than normal in the position outside the edge of the document. This results in the bright reflection. The irradiation light 207 with which the light guide 205 irradiates the document is normally dispersed with the irradiation direction as a center. In FIG. 4, a dotted-line arrow indicates the extension of the irradiation light 207, which reaches the outside of the end of the actual area of the document. In the above description, the document is illuminated from the downstream side in the sub-scanning direction, but the document may be illuminated from the upstream side in the sub-scanning direction. In that case, the area of the bright reflection appears on the upstream side of the document and the shadow area appears on the downstream side thereof.

Figure 5A:
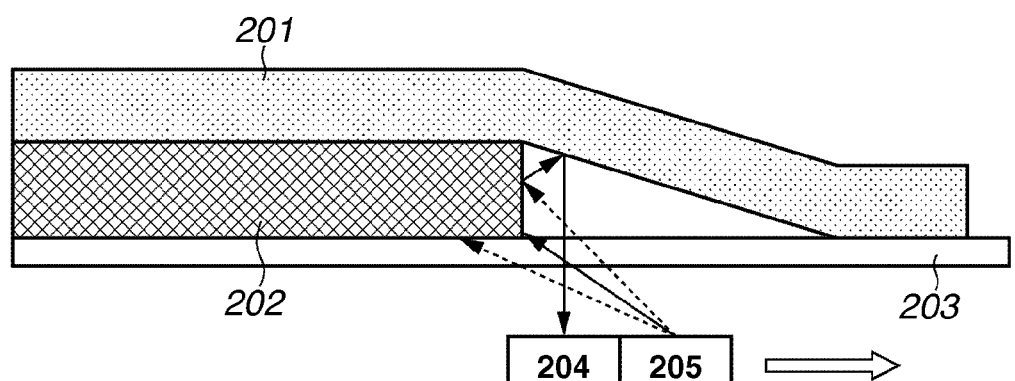
FIGS. 5A and 5B indicate the bright reflection width of the document.
Figure 5B:
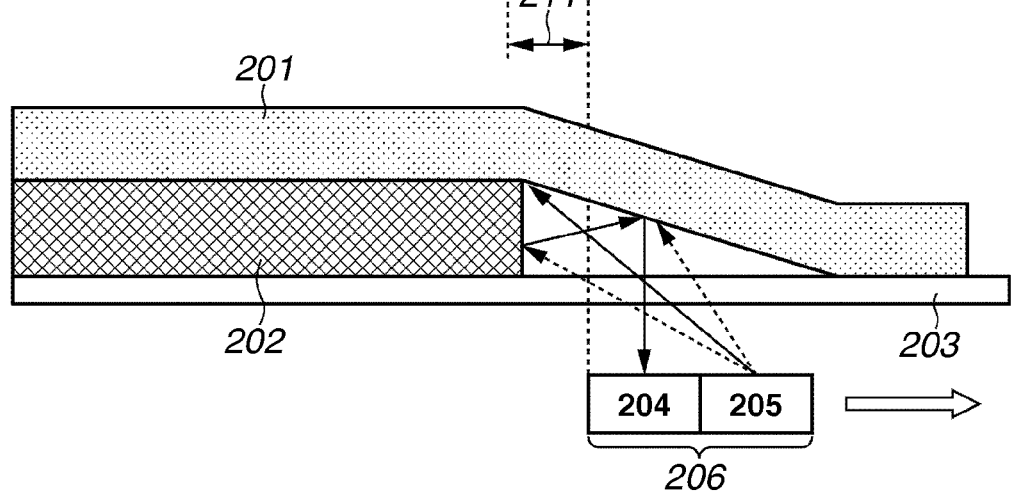

The width of the bright reflection is described. The color of the pressing plate 201 has to be white, for example, which sufficiently reflects light. If the pressing plate 201 is black, for example, which insufficiently reflects light, the bright reflection is hardly caused. The main factors determining the width of bright reflection are the thickness of the document, luminance around the edge of the document, and the tilt of the document if the document is rectangular. A relationship between the thickness of the document and the width of bright reflection is described using FIGS. 5A and 5B. In a case of the bright reflection, the irradiation light 207 from the light guide 205 is reflected by the side of the document 202, reflected again by the pressing plate 201, and reaches the line sensor 204. The irradiation light 207 has any extension angle. FIGS. 5A and 5B illustrate an optical path of the light which is reflected by the side of the document 202 and the pressing plate 201 and reaches the line sensor 204. FIG. 5A illustrates the case where the sensor unit 206 is located at the leftmost side when the bright reflection is caused. In this case, the irradiation light 207 (a dotted-line arrow) radiating upward from the center (a solid-line arrow) of the irradiation light 207 is reflected by the side of the document 202 and the pressing plate 201. On the other hand, FIG. 5B illustrates the case where the sensor unit 206 is located at the rightmost side when the bright reflection is caused. In this case, the irradiation light 207 (a dotted-line arrow) radiating downward from the center (a solid-line arrow) of the irradiation light 207 is reflected by the side of the document 202 and the pressing plate 201. A distance from the position of the sensor unit 206 in FIG. 5A to that of the sensor unit 206 in FIG. 5B is the width of bright reflection 211. As can be seen from FIGS. 5A and 5B, the thicker the document 202, the greater the amount of movement of the sensor unit 206 whose irradiation light 207 is incident on the side of the document 202. For this reason, the large width of bright reflection 211 is imaged on the scanned image data. On the other hand, the thinner the document 202, the smaller the amount of movement of the sensor unit 206 whose irradiation light 207 is incident on the side of the document 202. For this reason, the small width of bright reflection 211 is imaged.

The abovementioned thickness of the document 202 needs to be calculated to determine the width of bright reflection 211. In the present case, the thickness of the document 202 is calculated using the shadow projected on the side opposite to the bright reflection. As illustrated in FIG. 2, when the sensor unit 206 moves in the sub-scanning direction (from the left side of the document positioning plate 203 to the right side thereof), the bright reflection is caused on the lower end 209 of the document 202 and the shadow is projected on the upper edge 208 of the document 202. A mechanism which makes the shadow is described below with reference to FIG. 6.

Figure 6:
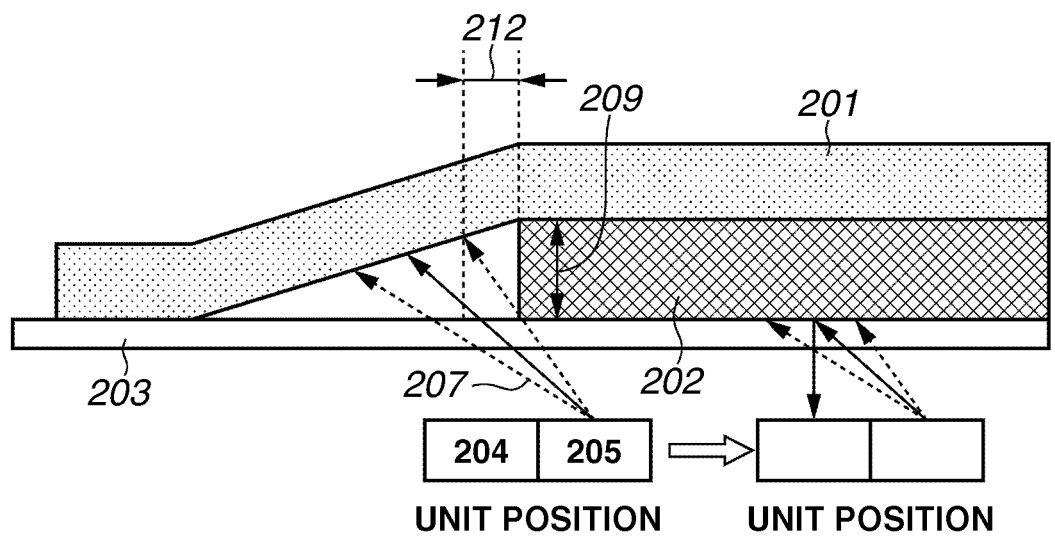
FIG. 6 illustrates a mechanism that makes a shadow of the document.

FIG. 6 is an enlarged view of the upper edge 208 of the document 202 unlike FIG. 4. When the light guide 205 lies in the unit position C in the figure, the document 202 obstructs the irradiation light 207 to generate an area on which light is not incident, which projects a shadow. A shadow area 212 is blackly imaged in the scanned image data. The irradiation angle of the irradiation light 207 is 45 degrees in general. The width of the shadow area 212 is measured to calculate the thickness of the document 202 as illustrated in FIG. 6 and detect the shadow. The thickness of the document 202 thus calculated from the scanned image data is used to enable calculating of the width of the bright reflection 211 attributed to reflection on the side of the document 202.

Figure 7:
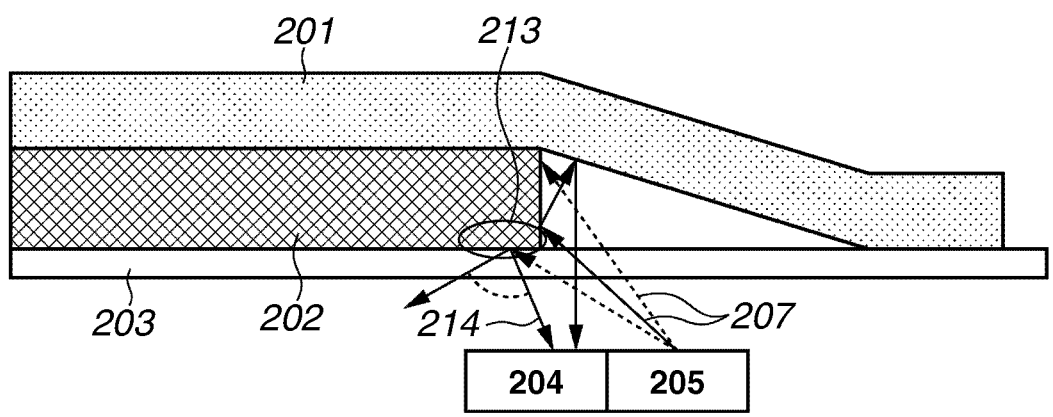
FIG. 7 illustrates a flare caused by reflection on the surface of the document.

A relationship between luminance around the edge of the document 202 and the width of bright reflection 211 is described using FIG. 7. Even when the center of the irradiation light 207 is incident on the side of the document 202, the light is also incident on a document surface 213 in the vicinity of the edge because the irradiation light 207 is diffused. Among the diffused light, the line sensor 204 receives the reflected light as a flare to increase the width of bright reflection 211 of the scanned image data. The higher the luminance of the document surface 213 in the vicinity of the edge, the stronger the reflected light. The lower the luminance, the weaker the reflected light. In other words, the width of bright reflection 211 varies with the luminance of the document surface 213 in the vicinity of the edge. The relationship is determined by measuring the relationship between the luminance of the document surface 213 in the vicinity of the edge and the reflected light received by the line sensor 204 in the sensor unit position where the irradiation light 207 is incident both on the document surface 213 in the vicinity of the edge and on the side of the document 202.

The width of bright reflection 211 in a case where the document 202 is placed perpendicularly to the sub-scanning direction is calculated from the two factors of the luminance of the document surface 213 in the vicinity of the edge and the thickness of the document 202. The width of bright reflection 211 is physically determined from the thickness of the document 202, the irradiation angle of the irradiation light 207, the diffusion angle of the irradiation light 207, the transmissivity of the glass plate 203, the gradient of the pressing plate 201 in the reflection area, and the relationship between the luminance of the document surface 213 in the vicinity of the edge and the reflected light received by the line sensor 204. However, it takes much processing time to calculate the width of bright reflection 211 by the scanner driver 103 for each scan. The above factors excluding the thickness of the document 202 and the luminance of the document surface 213 in the vicinity of the edge are known for each individual scanner. The previously calculated width of bright reflection is desirably stored in a table format. In other words, the thickness of the document 202 can be physically determined from the shadow area 212 of the document 202. The luminance of the document surface 213 in the vicinity of the edge can be determined from the scan image data. By referring to the table storing the above two values, the width of bright reflection 211 in a case where the document 202 is placed perpendicularly to the sub-scanning direction can be acquired.

Figure 8:
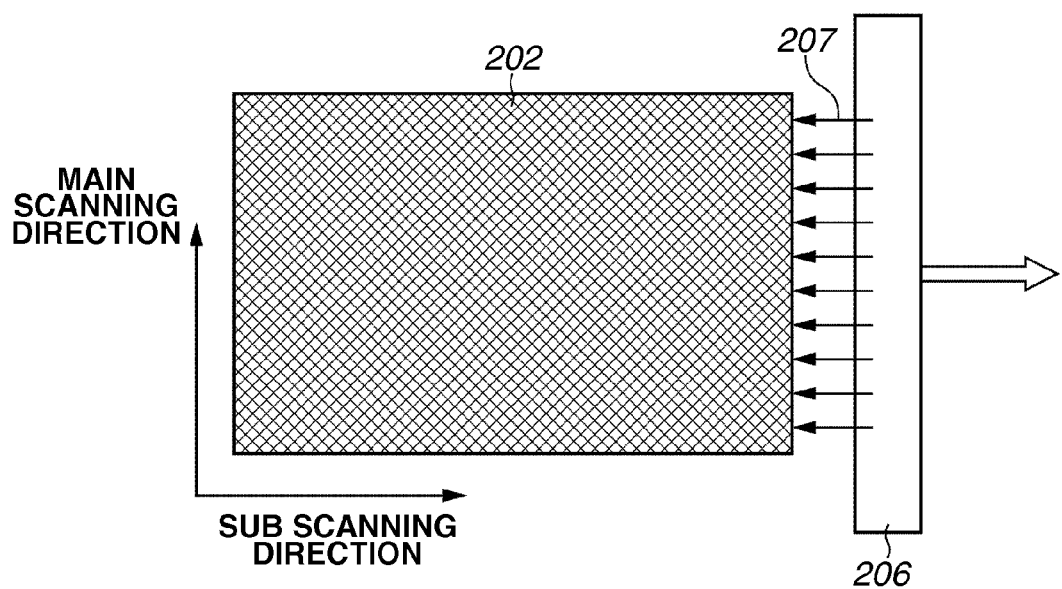
FIG. 8 illustrates irradiation light in a case where the document is placed perpendicularly to the sub-scanning direction.
Figure 9:
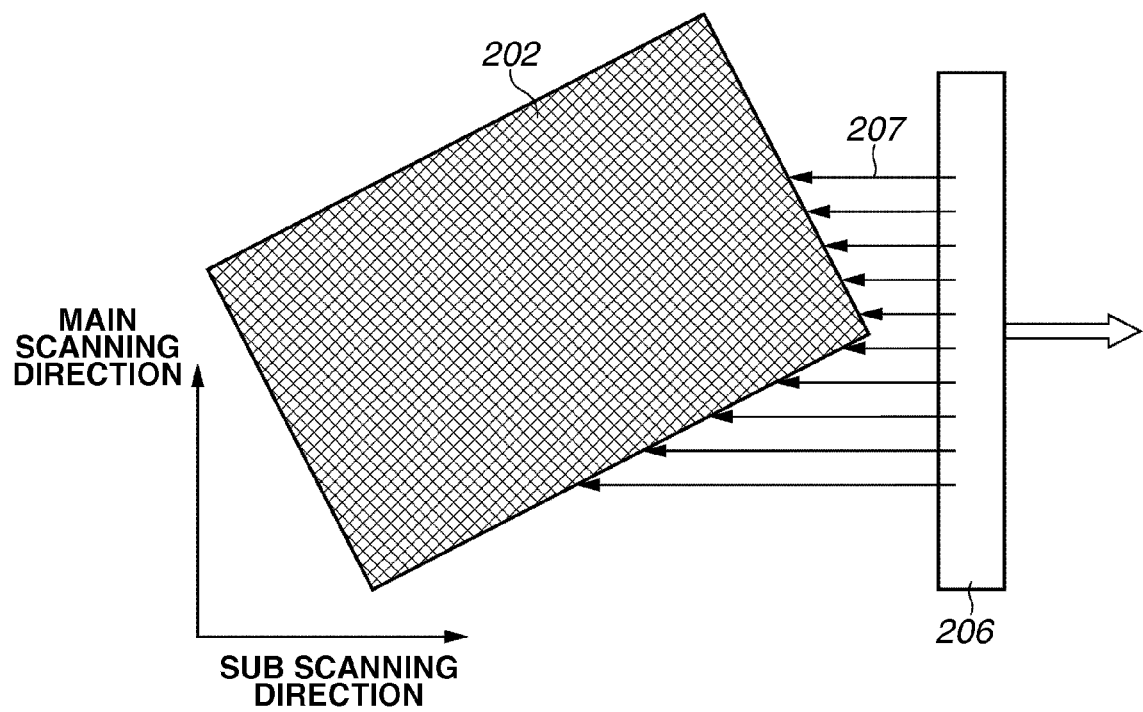
FIG. 9 illustrates irradiation light in a case where the document is placed at a tilt with respect to the sub-scanning direction.

The third factor for determining the width of bright reflection 211 is the tilt of the document if the document is rectangular. The relationship between the tilt and the width of bright reflection 211 is described below with reference to FIGS. 8 to 10. FIG. 4 describes the reflection that is caused by the irradiation light 207 reflected on the side of the document 202. FIGS. 8 to 10 illustrate the document 202 viewed from the top.

FIGS. 8 and 9 describe the case where the document is rectangular. As illustrated in FIG. 8, if the side of the document 202 on which the irradiation light 207 is incident is parallel with the longitudinal direction of the sensor unit 206 (the main scanning direction), the reflected light follows the optical path in FIG. 4 and the bright reflection is caused. On the other hand, as illustrated in FIG. 9, in a case where the document 202 is placed at a tilt with respect to the main scanning direction, the irradiation light 207 incident on the side of the document 202 is not regularly reflected and scattered along the edge of the document 202. As a result, the sensor unit 206 receives a smaller amount of light in FIG. 9 than in FIG. 8, which reduces the bright reflection. Thus, the width of bright reflection 211 becomes smaller in a case where a rectangular document is placed at a tilt than in a case where the rectangular document is placed in parallel with the main scanning direction. If the document is tilted by 90 degrees (in parallel to the sub-scanning direction), the amount of reflection is reduced to zero. In other words, the smaller the tilt of the document, the greater the width of bright reflection 211. On the other hand, the greater the tilt of the document, the smaller the width of bright reflection 211.

If the document is circular, the tangential tilt of each portion of the circle corresponds to the tilt of the rectangular document. In this case, the angle of tilt varies in each portion of the circle, so that different correction is performed for each portion of the circle. FIG. 10 illustrates the process flow in which the above processing is conducted by the scanner driver 103. In step S1001, a document area is extracted from the scanned image by an edge extraction processing. In step S102, the width of a shadow at the upper edge is acquired. In step 1003, the thickness of a document is calculated. In step S1004, the width of bright reflection is calculated. In step S1005, the width of bright reflection is multiplied by a reflection correction coefficient to determine the final width of bright reflection for bright area detection. The width is reduced based on the tilt of the document separately obtained as a correction coefficient according to the above description. A correction coefficient is further obtained from the luminance of the document in the vicinity of the edge. In step S1006, the area of bright reflection whose width is thus calculated is removed from the extracted document image to modify the document area and acquire an accurate document. The width is reduced based on the tilt of the document separately obtained as a correction coefficient according to the above description and a correction coefficient is further obtained from the pixel value of background of the document in the vicinity of the edge.

In the above description, the computer 100 performs image processing in the system in which the scanner 104 is connected to the computer 100. In this case, the processing according to the present invention is stored in a recording medium as a program and the program in the recording medium is read by the computer to cause the computer to execute the processing according to the present invention. The processing according to the present invention may be executed by a firmware of an MFP apparatus in which the scanner is integrated with an image processing apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-162096 filed Jul. 16, 2010, which is hereby incorporated by reference herein in its entirety.

What is claimed is:

1. A method comprising:
   acquiring a read image obtained by receiving, by a sensor, reflected light from an original placed on an original plate;
   detecting a bright area corresponding to reflected light from a side of the original in the acquired read image based on an opposite area corresponding to an edge of the original opposite to the side; and
   determining an original area corresponding to the original in the acquired read image, based on the detected bright area.

2. The method according to claim 1, further comprising:
   detecting a shadow area, at the edge opposite to the side, where an amount of light incident on the sensor is small,
   wherein the bright area is detected based on the detected shadow area.

3. The method according to claim 1, further comprising:
   detecting tilt of the original in the original plate,
   wherein, in detecting the bright area, the bright area of a width based on the detected tilt is detected.

4. The method according to claim 1, further comprising:
   detecting the original area from which the detected bright area is removed.

5. The method according to claim 1, further comprising:
   obtaining a pixel value of background of the original from the acquired read image, wherein, in detecting the bright area, the bright area of a width based on the pixel value of the background, is detected.

6. A non-transitory computer-readable storage medium storing a computer-executable process, the computer-executable process causing a computer to execute the method according to claim 1.

7. The method according to claim 4, further comprising:
specifying a provisional area corresponding to the original, in the read image,
wherein the original area is detected in which the detected bright area is removed from the specified provisional area.

8. The method according to claim 2, wherein the bright area of a width based on a width of the detected shadow area is detected.

9. The method according to claim 1, wherein the sensor is a line sensor, and a read image is acquired by the line sensor receiving reflected light from the original while moving.

10. The method according to claim 3, wherein the bright area of a width based on the detected tilt and a shape of the original, is detected.

11. An image processing apparatus, comprising:
an acquiring unit for acquiring a read image obtained by receiving, by a sensor, reflected light from an original placed on an original plate;
a detecting unit for detecting a bright area corresponding to reflected light from a side of the original in the acquired read image based on an opposite area corresponding to an edge of the original opposite to the side; and
a determining unit for determining an original area corresponding to the original in the acquired read image, based on the detected bright area.

12. The apparatus according to claim 11, further comprising:
a detecting unit for detecting a shadow area, at the edge opposite to the side, where an amount of light incident on the sensor is small,
wherein the bright area is detected based on the detected shadow area.

13. The apparatus according to claim 11, wherein the detecting unit detects tilt of the original in the original plate, and in detecting the bright area, the bright area of a width based on the detected tilt is detected.

14. The apparatus according to claim 11, wherein the detecting unit detects the original area from which the detected bright area is removed.

15. The apparatus according to claim 11, further comprising:
an obtaining unit for obtaining a pixel value of background of the original from the acquired read image,
wherein, when the detecting unit detects the bright area, the bright area of a width based on the pixel value of the background, is detected.

16. The apparatus according to claim 14, further comprising:
a specifying unit for specifying a provisional area corresponding to the original, in the read image,
wherein the original area is detected in which the detected bright area is removed from the specified provisional area.

17. The apparatus according to claim 12, wherein the bright area of a width based on a width of the detected shadow area is detected.

18. The apparatus according to claim 11, wherein the sensor is a line sensor, and a read image is acquired by the line sensor receiving reflected light from the original while moving.

19. The method according to claim 13, wherein the bright area of a width based on the detected tilt and a shape of the original, is detected.

* * * * *